United States Patent [19]

Stanelle

[11] Patent Number: 5,338,325
[45] Date of Patent: Aug. 16, 1994

[54] FILTER CARTRIDGE

[76] Inventor: Karl-Heinz Stanelle, Rosenstrasse 4, D-7129 Guglingen 2, Fed. Rep. of Germany

[21] Appl. No.: 651,340

[22] PCT Filed: Aug. 9, 1989

[86] PCT No.: PCT/EP89/00940
    § 371 Date: Feb. 4, 1991
    § 102(e) Date: Feb. 4, 1991

[87] PCT Pub. No.: WO90/01364
    PCT Pub. Date: Feb. 22, 1990

[30] Foreign Application Priority Data

Aug. 13, 1988 [DE] Fed. Rep. of Germany ... 8810295[U]

[51] Int. Cl.$^5$ .............................................. B01D 46/04
[52] U.S. Cl. ........................................... 55/213; 55/302
[58] Field of Search ................... 55/213, 302, 498, 521

[56] References Cited

U.S. PATENT DOCUMENTS

| 4,504,288 | 3/1985 | Kreft | 55/302 |
| 4,650,504 | 3/1987 | Howeth | 55/302 |
| 4,690,700 | 9/1987 | Howeth | 55/302 |
| 4,704,951 | 11/1987 | Pruchon | 55/213 X |

Primary Examiner—Charles Hart
Attorney, Agent, or Firm—Collard & Roe

[57] ABSTRACT

A filter cartridge (16) for cleaning the dedusting filter of a silo by means of an air nozzle (26) into which air is blown intermittently and which is disposed above a filter cartridge (16), provided with a filter jacket (18), in the filter 12, characterized in that at least one blanking body (22) is provided in the interior of the filter cartridge (16) and is practically out of contact with the filter jacket (18) of the filter cartridge, said body being closed on all sides or its opening being so positioned in the filter cartridge with respect to the air nozzle (38, 40) that no air can be bloom into it through the air nozzle (38, 40).

5 Claims, 1 Drawing Sheet

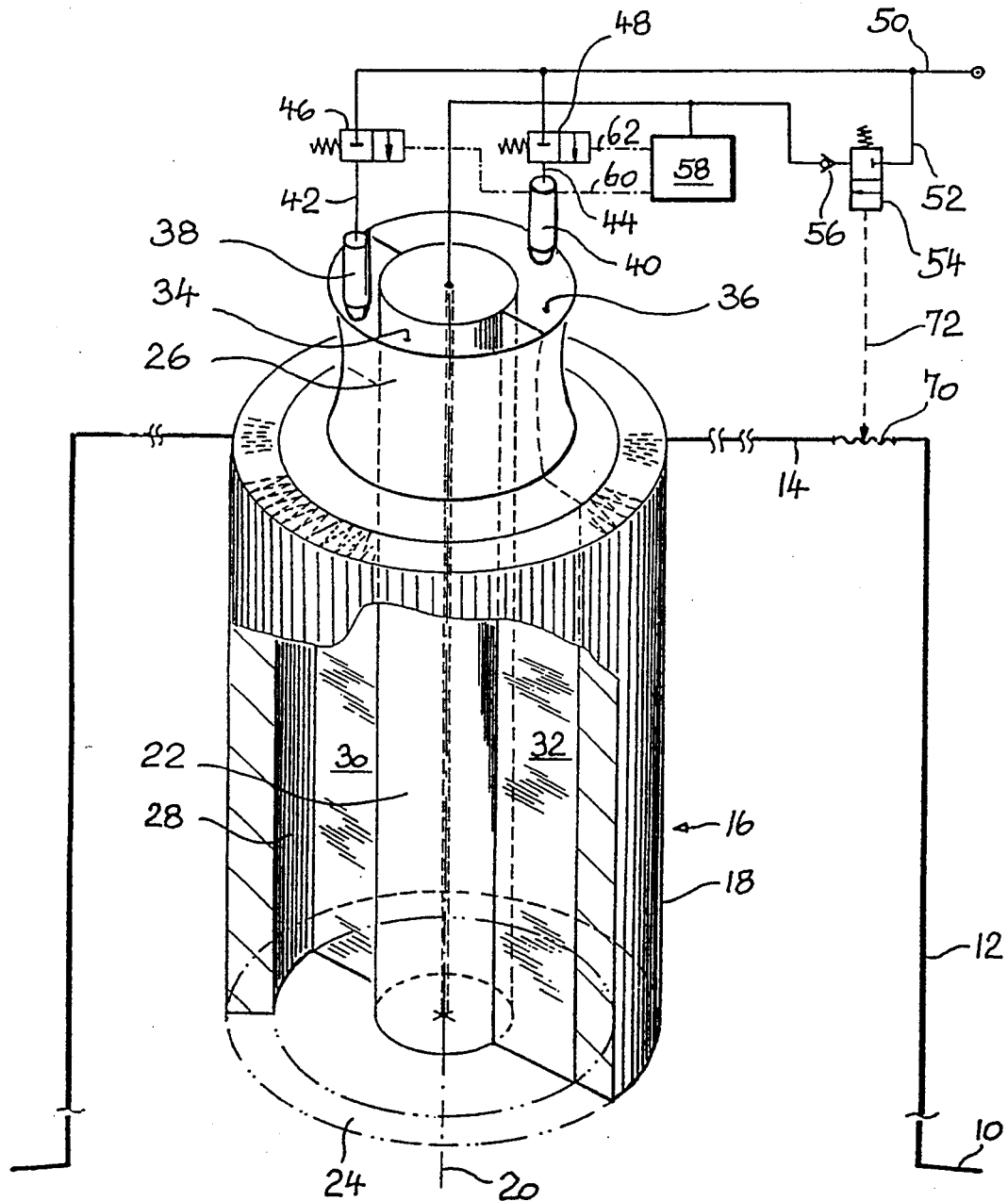

FILTER CARTRIDGE

BACKGROUND OF THE INVENTION

1. Field of the Invention

The present invention relates to a filter cartridge for cleaning the dedusting filter of a silo. Cleaning is effected by air blown intermittently into the filter cartridge and introduced through an air nozzle disposed above the filter cartridge.

A dedusting filter of this kind is used for filtering the outgoing air during pneumatic filling of a silo with pulverulent bulk material, such as for example cement. During the filling operation the air used as carrier medium for the filling flows, together with the filling material, from the outside against the filter surface forming a filter jacket of the filter. Since only the air can escape through the filter to the atmosphere, the filling material is deposited on the outside of the filter surface. To prevent the filter from becoming ineffective, it must be cleaned from time to time.

2. The Prior Art

It is known to clean the filter by intermittently blowing compressed air from above into its interior. During this cleaning operation the filter cannot perform its filtration function, since during this period no air can flow through its filter jacket from outside to inside.

In order to ensure that during the cleaning operation, in the course of which the pressure inside the filter is raised by the compressed air blown in, the pressure relief valve on the silo will not open with the consequence that filling material will be blown out of the silo through this forced venting, which is highly undesirable both for reasons of economy and, in particular, because of the consequent pollution of the environment, it is known from WO 87/02268 to dispose a plurality of filter cartridges inside a filter and to clean them in turn at intervals so timed that the filter cartridges are never all cleaned at the same time and thus made unavailable for the filtering operation. The air nozzles allocated to the various filter cartridges are controllably connected to an additionally provided air reservoir in such a manner that after a cleaning cycle, which is brought into action through the existence of a determined superatmospheric pressure in the filter, at least one further cleaning cycle can take place. It is thus ensured that on completion of a filling operation the filter tubes will be in a clean condition.

The smaller the filter cartridge, the easier it is—that is to say the smaller the amount of air required—to produce superatmospheric pressure in the filter cartridge for cleaning purposes. Filter cartridges of the smallest possible diameter are therefore desirable from the point of view of cleaning. On the other hand, the filter action depends on the size of the filter jacket. However, the fewer the filter cartridges used to provide a determined total filter jacket surface, the lower the overall cost of the filter will be. A smaller number of filter cartridges for a comparable filter surface will of course necessitate filter cartridges of a larger diameter. The size of the diameter of a filter cartridge is of practically no importance where the filtering operation is concerned, but on the other hand a larger filter cartridge diameter has a detrimental effect on cleaning, since the nozzle disposed about the filter cartridge must be designed for a corresponding high air delivery.

A filter cartridge of the type first mentioned above is known from EP-A 0 225 445. A rod, which is surrounded by a jacket of circular annular cross section, projects centrally through the filter cartridge of circular cross section which is disclosed therein. Between this jacket and the filter longitudinally extending partitions are provided, which subdivide the interior of the filter cartridge into a plurality of interior regions. Above each of these interior regions is disposed an air nozzle through which compressed air can be blown into the interior of the respective interior region. The compressed air required for this purpose is supplied from outside to the filter cartridge by way of a pipe system.

In the filter cartridge known from EP-A 0 142 951 the interior space is likewise subdivided into a plurality of pocket-like interior regions by means of a plurality of partitions extending in the vertical direction. These interior regions can likewise be supplied with compressed air one after the other by means of respective air nozzles disposed above them. This compressed air is likewise supplied to the filter cartridge from outside.

SUMMARY OF THE INVENTION

It is an object of the present invention to provide filter cartridges for a filter which are optimal both in respect of their filter action and in respect of the cost of cleaning them.

This invention comprises the features of the main claim. For a filter cartridge for cleaning the dedusting filter of a silo of the type first mentioned above the invention is accordingly characterized in that at least one blanking body is provided in the interior of a filter cartridge and is practically out of contact with the filter jacket of the filter cartridge, said body being closed on all sides or its opening being so positioned in the filter cartridge with respect to the air nozzle that no air can be blown into it through the air nozzle. In a filter cartridge of this kind the blanking body reduces the size of the interior space of the filter cartridge, so that the superatmospheric pressure required for cleaning purposes in the interior of the filter cartridge can be built up with a correspondingly smaller amount of air and therefore more quickly. This has the consequence that the at least one air nozzle provided above the filter cartridge can be designed for a smaller air delivery. Since the blanking body is practically out of contact with the filter jacket of the filter cartridge, the filter action is not impaired. It is thus possible to use filter cartridges of relatively large diameter, which leads to a smaller total number of filter cartridges in a filter. This has important economic advantages.

In order to enable comparatively still smaller air nozzles to be used, partitions are advantageously provided in the filter cartridge and connect the inside of the filter jacket to the outside of the blanking body so airtightly that the interior space of the filter cartridge is subdivided into a plurality of interior regions which are open at the top and at the sides are bounded by parts of the filter jacket and parts of the blanking body, while an air nozzle can then be provided above each of these interior regions. The effective interior space existing inside a filter cartridge is subdivided by the interspaces in such a manner that, rather than a single interior space reduced in size, a plurality of interior regions of still smaller size are formed in relation to a single air nozzle. In order to reduce the air requirement, a venturi nozzle is advantageously disposed between an air nozzle and the filter cartridge.

A particularly advantageous further development of the invention is characterized in that the blanking body, which extends in the longitudinal direction of the filter cartridge through the entire interior space of the filter cartridge and through the interior space of the venturi nozzle, is disposed centrally inside the filter cartridge, and that at least two partitions are provided which are disposed separately from one another and have a plane surface, and which in each case abut at one face against the inside of the filter jacket or the inside of the venturi nozzle, and at their opposite face against the outside of the blanking body, each wall lying air-tightly against the blanking body. Both the filter cartridge and the venturi nozzle disposed above it are thus subdivided by the blanking body and the partitions into a plurality of interior regions in a constructionally simple manner.

The blanking body can advantageously be used not only for reducing the size of the internal volume, but also as the air reservoir required in the previously mentioned prior art for operating the air nozzles. Through integration of the air reservoir with the cartridge, the filter containing the filter cartridge can thus be given the desired compact construction.

Further developments and advantages of the invention can be seen from the further features indicated in the claims.

BRIEF DESCRIPTION OF THE DRAWINGS

Other objects and features of the present invention will become apparent from the following detailed description considered in connection with the accompanying drawing which discloses the embodiment of the present invention. It should be understood, however, that the drawing is designed for the purpose of illustration only and not as a definition of the limits of the invention.

The single figure shows schematically in perspective a filter cartridge disposed on the schematically represented roof of a silo.

DETAILED DESCRIPTION OF PREFERRED EMBODIMENTS

Turning now in detail to the drawing, the figure shows the hollow cylindrical casing of a filter 12 mounted on a silo roof 10. The interior of the filter 12 forms a unit with the interior of the silo.

From the silo roof 14, which is closed at the top, a filter cartridge 16, open at the top, projects down into the filter 12. The outside surface of the filter cartridge 16 is formed by a filter jacket 18 folded in zigzag form. The filter jacket may also consist of a filter tube or other filter medium customarily used in filter techniques. The filter cartridge may also have any desired cross-sectional shape.

An air reservoir 22, of circular cylindrical form in the example shown, is disposed centrosymmetrically in the interior of the filter cartridge 16 extending in the longitudinal direction 20, and projects upwards, from the bottom surface 24 of the filter cartridge 16 which is closed at the bottom, right through the filter cartridge 16. The air reservoir 22 also projects through the interior of a venturi nozzle 26, which is also mounted from above on the filter cartridge 16, centrally in relation to the longitudinal direction 20.

Between the air reservoir 22 and the inside 28 of the filter jacket 18 are disposed two partitions 30, 32, which extend in the longitudinal direction through the filter cartridge 16 and the venturi nozzle 26 and lie with one face against the inside 28 and with their opposite face against the outside of the air reservoir 22.

The connection of these walls 30, 32 to the air reservoir 22 is air-tight. Outside the air reservoir 22 two interspaces 34, 36 are thus provided in the region of the venturi nozzle 26 and of the filter cartridge 16. Above each interspace 34, 36 and air nozzle 38, 40 is disposed. Each of these two nozzles is connected via a short pipe 42, 44 to a two-way valve 46 and 48, respectively. The two-way valves 46, 48 are in turn connected to a supply pipe 50, which in its turn is in continuous conductive communication with an air storage tank or a compressor.

From the supply pipe 50 another air pipe 52 branches off and is connected via a switch 54 in the form of a two-way valve and a downstream nonreturn valve 56 on the one hand to a valve block 58 and on the other hand to the air reservoir 22 disposed in the interior of the filter cartridge 16.

From the valve block 58 pneumatic connecting pipes 60 and 62 respectively lead to the respective two-way valves 46 and 48. These two-way valves 46, 48 are controlled through this valve block 58. Control is pneumatic, against the action of restoring springs holding the two valves in their "off" position.

The components of the filter which are disposed above the roof 14 and also those of the pneumatic control device are covered by a hood (not shown).

The supplying of air from the compressor through the air nozzles 38, 40 into the filter cartridge 16 is effected in the following manner.

Compressed air is continuously connected to the nozzles via the pipe 50. In the position of rest the valves 46, 48 are in their closed position shown in the drawing, so that the air cannot be blown through the nozzles into the respective interspace 34 or 36.

The air pipe 52 is also continuously filled with compressed air. As soon as a determined superatmospheric pressure is now built up in the silo and therefore in the interior of the filter 12 because of the deposition of a certain amount of filling material on the outside of the filter jacket 18, a diaphragm 70 provided in the roof 14 curves out so far in the upward direction that, through the action of a feeler lever 72, which is also displaced in the upward direction, the switch 54 is opened against the force of a restoring spring. The air can thus flow out of the pipe 52 both into the valve block 58 and into the air reservoir 22. From the valve block 58 the air then flows via the connecting pipes 60, 62 to the valves 46, 48. The logic circuit arrangement provided in the valve block 58 is such that the two valves 46, 48 are opened one after the other with an interval of time. Before the next valve is in each case opened, the previous valve is closed. Air is thus always blown only into one interspace 34 or 36. During this blowing operation the air reservoir 22 is under superatmospheric pressure.

The cleaning operation is repeated in successive cycles as long as the diaphragm remains in its upwardly arched position. The air required for this purpose is supplied to the pipe 50 from the compressor (not shown). As soon as the superatmospheric pressure in the filter, and thus also in the silo, has fallen below a desired value and the diaphragm 70 has dropped back from its maximum arched position, the feeler lever 72 also moves downwards, so that the switch 54 assumes its position shown in the drawing. In this position the supply of air to the valve block 58 and to the air reservoir 22 is interrupted. the air now escapes out of the air reservoir 22. Because of the nonreturn valve 56 this air can escape only into the valve block 58. Consequently, the valve block 58 is once more loaded with air, so that at least once more the valves 46, 48 can be moved to their "on" position. Thus at least one more cleaning operation takes place. The superatmospheric pressure in the air reservoir 22 is then relaxed, so that the valve block 58 can no longer be loaded with control air. Consequently, the cleaning operation is completely terminated. At this moment every region of the filter jacket 18 has been completely cleaned. The next cleaning operation will start only when once again a determined superatmospheric pressure has been reached inside the filter 12 and as a consequence the diaphragm 60 has curved out to a determined extent.

Although only one filter cartridge 16 is shown in the filter 12, a plurality of such filter cartridges 16 or also other filter cartridges having only a uniform interior space may of course be provided.

From the air reservoir 22 both the air nozzles of a single filter cartridge 16 and, when a plurality of filter cartridges are provided, this plurality of nozzles can be controlled.

When a plurality of filter cartridges are provides inside a filter 12, the air nozzles 38, 40 of a filter cartridge corresponding to the filter cartridge 1 can also be conjointly switched. It must then simply be ensured that the filter cartridges provided in a filter are not all cleaned at the same time. This can easily be achieved by means of a suitably timed alternate cleaning operation for the individual cartridges.

The arrangement of any desired number of partitions in a filter cartridge or other filter body, such as for example a plate type filter, makes it possible to produce the required filter surface with only a single filter body. The absence of another filter body makes it possible to ensure that there are no filter surfaces of a neighboring filter body which lie opposite the filter surface of the filter body in question. The depositions thrown off from the filter jacket during the cleaning of the latter thus cannot become attached to other filter jacket surfaces.

I claim:

1. Filter cartridge for cleaning the dedusting filter of a silo by means of at least one air nozzle into which air is blown intermittently and which is disposed above a filter cartridge, provided with a filter jacket, in the filter, wherein
   at least one blanking body is provided in the interior of the filter cartridge;
   at least one interspace is provided between the blanking body and the filter jacket;
   the blanking body is closed on all sides or its opening is so positioned in the filter cartridge with respect to the air nozzle that no air can be blown into it through the air nozzle, characterized in that the blanking body is in the form of a compressed air reservoir adapted to be connected via an airpipe to a compressed air supply means.

2. Filter cartridge according to claim 1,
   wherein partitions are provided which connect the inside of the filter jacket to the outside of the blanking body so airtightly that the interior space of the filter cartridge is subdivided into a plurality of interior regions which are open at the top and at the sides are bounded by parts of the filter jacket and parts of the blanking body, and that an air nozzle is provided above each of these interior regions.

3. Filter cartridge according to claim 1,
   wherein a venturi nozzle is disposed between the at least one air nozzle and the filter cartridge.

4. Filter cartridge according to claim 2,
   wherein a blanking body is provided which is disposed centrally inside the filter cartridge and extends in the longitudinal direction of the filter cartridge through the entire interior space of said filter cartridge and through the interior space of the venturi nozzle;
   wherein at least two partitions are provided which are disposed separately from one another and have a plane surface, and which abut at one face against the inside of the venturi nozzle and at their opposite face against the outside of the blanking body, each wall lying airtightly against the blanking body.

5. Filter cartridge according to claim 1,
   further comprising compressed air supply means and an air pipe; and
   wherein the blanking body is in the form of a compressed air reservoir adapted to be connected via the air pipe to the compressed air supply means.

* * * * *